July 24, 1962 — I. BREGMAN — 3,045,541

SLIDE PROJECTOR

Filed Sept. 8, 1958

INVENTOR.
IRVIN BREGMAN
BY Pyle & Fisher
ATTORNEYS 3,045,541
SLIDE PROJECTOR
Irvin Bregman, P.O. Box 1261, Plainfield, N.J.
Filed Sept. 8, 1958, Ser. No. 759,484
3 Claims. (Cl. 88—24)

This invention relates in general to devices known as photographic slide projectors, and more specifically to a slide projector which is designed to simultaneously transmit two intelligences in proportioned relationship.

Copending application for patent Serial No. 696,435 filed by Irvin Gregman on November 14, 1957, under the title, "Combination Photograph Disc Record Unit and Automatic Exhibiting and Playing Means Thereof," and copending application for patent Serial No. 759,541 filed Sept. 8, 1958 by Irvin Bregman under the title, "Picture and Word Message Holder," both relate to an overall development of which the invention disclosed here forms a part. This development is directed to the broad concept of simultaneously providing two intelligences where one of the intelligences presented is a pictorial image and the other is a related message or complimentary image.

Previous attempts have been made to simultaneously project a picture and a word message. These previous mechanisms have, however, been rather large, intricate, and expensive; and the resulting picture was not proportionately related. They are well beyond the means of the majority of amateur photographers. The development referred to here is designed to bring to the amateur photographer an economic arrangement for simultaneously projecting these two intelligences.

The copending photograph and projector application presents an invention directed to simultaneously projecting a picture message and an audible word message. The copending application for patent entitled "Picture and Word Message Holder" is directed to a holder which carries two intelligence providing media where one of those media is a picture, and the other provides a word message, whether that message be audible or visual.

This application provides a photographic projector for simultaneously projecting a picture image and a word message. The practice of presenting a word message with a photographic slide is well known in the prior art. However, this practice has generally been confined to projection through a single optical system with transparencies which carry both the word message and the picture message. In the illustrated embodiment of the present invention, two transparencies are carried by a single holder. One of these transparencies is a picture transparency, and the other is a word message transparency. The word message and picture image are simultaneously projected on a screen by a projector which has two lens systems, to provide proportional relationship.

Accordingly, one of the principal objects of this invention is to provide a novel and improved projector having a plurality of related optical systems and which projector is designed to carry a plural intelligence holder for separate but related projection.

In the prior art techniques for presenting word messages through slide projection, the preparation of the word message is a highly specialized art requiring both special skills and special equpment. It is necessary to very accurately provide the word message in a very minimal size. A handwritten message, or even a typed message, tends to overpower the photograph so that the word message dominates the projected image. In the illustrated embodiment of the present invention the two optical systems provided have different powers of magnification. Thus a greatly magnified photograph is presented, and an artistically proportioned word message is provided by the other and lower power optical system.

Therefore, another of the principal objects of this invention is to provide a photographic projector having two optical systems wherein one of the optical systems has a greater power of magnification than the other.

Still another and more specialized object of the invention is to provide a projector having first and second optical systems and light deviation means arranged to deviate light emitted from a single projection lamp in order that the one lamp will activate both the first and the second optical system.

Still another and more specialized object of the invention is to provide a projector having a housing with two lens assemblies wherein one of the assemblies is adjustable relative to the other in order that the word and picture messages may be projected contiguous to one another, or if desired, one may be superimposed upon the other.

Other objects and a fuller understanding of this invention may be had by referring to the following description and claims, taken in conjunction with the accompanying drawing, in which:

Figure 1:
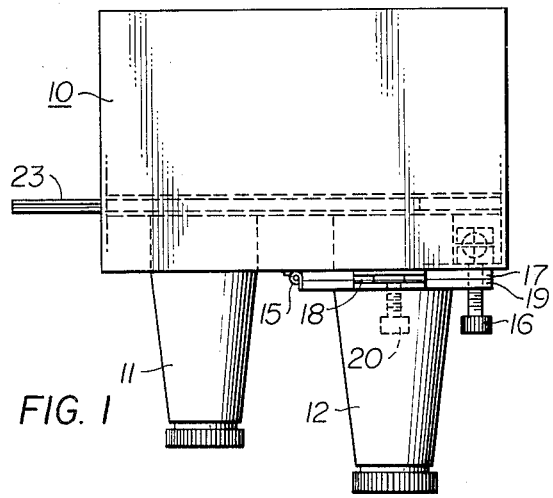
FIGURE 1 is a top plan view of one of the projectors of the present invention.
Figure 2:
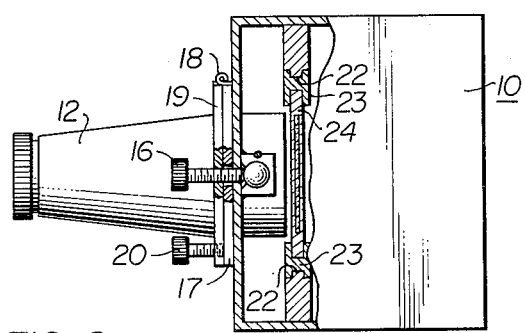
FIGURE 2 is a side elevational view of the device of FIGURE 1, with parts broken away and removed.

Referring to the drawing the housing is shown generally at 10. First and second projector lens assemblies 11 and 12 are fixed to and form a part of the housing 10. The projector lens assemblies 11, 12 carry lenses and other parts of first and second optical systems. The optical systems are shown schematically in FIGURE 4 and will subsequently be described in more detail.

The housing 10 may be orientated by any convenient means, such as a screw adjusted foot member, which is quite conventional and accordingly not illustrated. When the device is in operation, the focal axes of the optical systems which essentially coincide with the axes of the projector lens assemblies 11 and 12, are essentially horizontal. They are also generally parallel. It will be seen, however, that depending upon the distance of a screen on which the image is to be projected, the axes may be somewhat convergent or divergent to project the contiguous images, if that is desired. Accordingly, the projector lens assembly 12 is adjustably carried by the housing 10.

A convenient arrangement is illustrated in order to provide both horizontal and vertical adjustment of the projector lens assembly 12 with respect to the housing 10. As illustrated, an adjustment plate 17 and a pivot plate 19 cooperate as a double hinge mounting base. The plate 17 is hinged to the housing 10 for a horizontal swinging movement and the pivot plate 19 is hinged to the plate 17 for vertical swinging movement. Hence a compound adjustment of the projector lens assembly 12 may be obtained by pivotally swinging the plates 17 and 19.

More specifically, a hinge 15 is provided along one vertical edge of the adjustment plate 17 to provide horizontal adjustment of the plates 17 and 19. On the opposite side a horizontal adjustment screw 16 is provided. The adjustment screw 16 is swivelably carried by the housing 10 and is threadably engaged with the plate 17. A clearance space is provided through the plate 19 in order that the plate 19 may not interfere with operation of the screw 16 or in turn be obstructed from free movement by the screw 16. Thus, the screw 16 may be rotated to threadably drive plate 17 toward or away from the housing 10 to provide horizontal movement of the projector assembly 12.

In like manner, vertical adjustment is achieved through a vertical adjustment hinge 18 which joins the plates 17 and 19 at a position which is in right angle relationship with respect to the axis swing of the hinge 15. Thus, the hinge 18 could be at the top or the bottom of the two plates, but is illustrated as being in the top position. A vertical adjustment screw 20 is threadably carried between plate 19 and contacts the adjustment plate 17. Gravity will thus aid in the vertical adjustment. As the adjustment screw 20 is threaded inwardly, it will force the base of the pivot plate 19 outwardly and pivot the projector lens assembly 12 vertical with respect to the housing 10. A reverse threading movement of screw 20 will permit gravity to force the projector assembly 12 downwardly.

A carriage 23, is provided. The carriage 23 is reciprocable along a track 22 in the housing 10. The carriage 23 supports an interchangeable slide holder 24, for reciprocal movement. The carriage 23 is reciprocable along a rectilinear path which is transverse to the axes of the objective assemblies 11, 12. The carriage 23 reciprocates in and out of the housing 10 to permit interchange of slide holders 24. Carriage 23 may be replaced by an automatic slide changer in actual practice, if desired.

Figure 3:
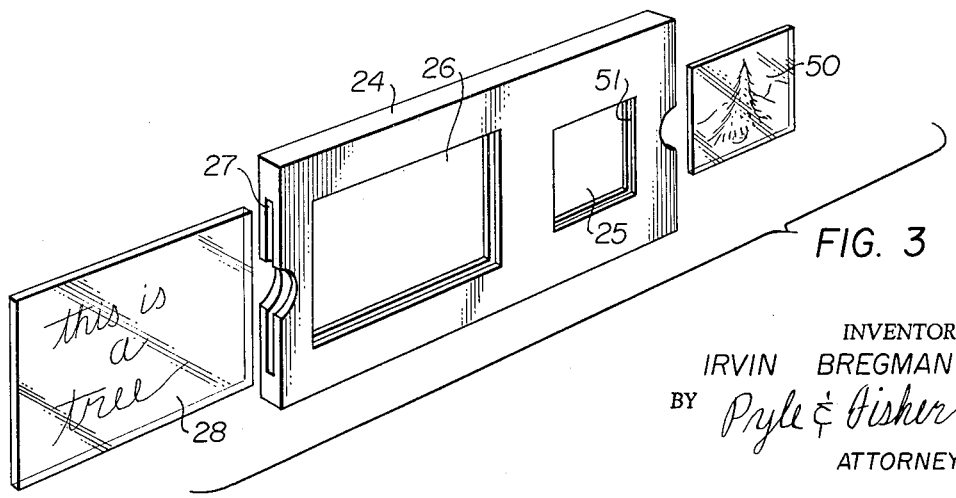
FIGURE 3 is a perspective exploded view of one of the novel and improved holders for two transparencies to be carried by the holder; and, FIGURE 4 is a schematic view of the projector showing two optical systems and a positioned slide holder.

Each slide holder 24 has first and second spaces 25 and 26—FIGURE 3. The space 25 is smaller and it is designed for holding a photographic transparency 50 which is insertable through an access slot 51. In this embodiment the space 26 is the larger. An access slot 27 is provided which permits insertion of a message transparency 28 for positioning at 26. The message transparency 28 is of large size to permit use of a handwritten or other inexpensively prepared message. This permits the obtainment of one of the outstanding advantages of the invention. There is no need for preparation of a very accurate word message and then photographing it or otherwise reducing it to a size which is artistically proportional to the photograph. Observe that the large size of transparency 28 is a convenience which is permitted and often useful, but this invention is not limited to the provision of one of the transparencies being larger than the other. Further, in prior art techniques common practice was to prepare a word message and then photograph it to a size desired. Thereafter, it was either mounted with the picture or the picture and word message might be photographed together to provide one photographic image with both messages in the desired proportions.

It will be seen that with the present technique a word message may be simply and inexpensively prepared. The word message may be changed as frequently as may be desired with great facility.

Projection of these transparencies of differing sizes is provided in a fashion which is pleasing to the eye through the use of the dual optic system. The optical systems are of different powers of magnification. The optical system including the projector lens assembly 11 may, for example, be of relatively great magnification power to transmit the image provided by the transparency carried in the aperture 25. The optical system which includes the projector lens assembly 12 may, on the other hand, have a relatively low power of magnification to transmit an image from the transparency carried in the apertured space 26.

Figure 4:
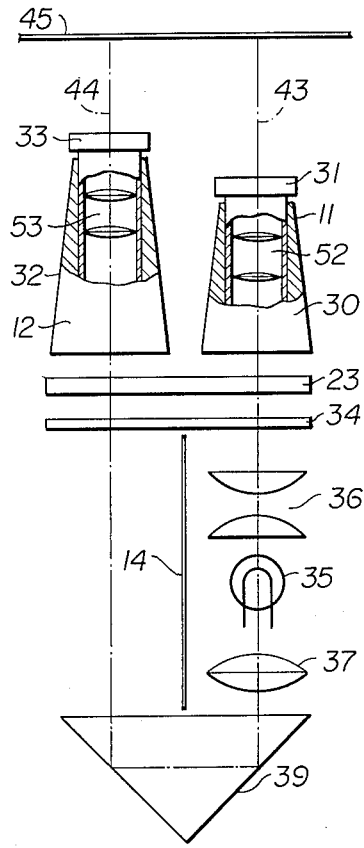

In FIGURE 4 a schematic diagram sets out the preferred optical systems. The projector lens assemblies 11 and 12 are shown schematically. Each is characteristically a conventional projector. A fixed sleeve 30 carries a movable sleeve 31. Lenses 52 are carried in sleeve 31 and are thereby adjusted. A similar arrangement is provided by fixed sleeve 32, adjustable sleeve 33, and lenses 53. Therefore, part 11 is composed of members 30, 31, and 52, whereas part 12 is composed of members 32, 33, and 53. The remainder of the optical systems is provided to the side of the carrier 23, opposite from the projector lens assemblies 11 and 12. A heat absorbent glass 34 is interposed between the lamp 35 and the carrier 23 to protect the holder 24 and the transparencies carried therein from the heat of the lamp. Light condensing systems 36, 37 are provided in the first and second optical systems respectively. The light is restricted to proper channels by divider wall 14. Light deviation means are provided in the form of a prism 39. The prism 39 reflects light emitted by the lamp 35 to permit a single source of light to provide the projection power for both optical systems. It will be seen that one may substitute two prisms and center the light as an alternate arrangement.

The first optical system, which includes the lens assembly 11, has a focal axis 43 which is shown by a dotted line. The second optical system, which includes the projector lens assembly 12, has a focal axis which is shown by the dotted line 44. Images are projected along the axes 43, 44 against a suitable screen 45. It will be seen by manipulating the adjustments that have been described, a word message may be disposed alongside the picture image or immediately beneath it. Alternately, it may be desired, and it is possible, to superimpose one upon the other.

While the invention has been described with a great deal of clarity and detail, it is believed that in essence it comprises a photographic projector having first and second optical systems of different powers of magnification for projection of transparencies of different size in compatible fashion.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a slide projector and first and second transparent slides positioned in spaced relationship in a single interchangeable holder for simultaneous projection, said slide projector having first and second lens systems, said lens systems each having a discernibly different focal length, means to simultaneously position said first and second slides in focal alignment with said first and second lens systems respectively, and means to simultaneously remove said slides in said single holder from focal alignment with said lens system, whereby a plurality of pairs of transparent slides may be shown in a preselected sequence.

2. In the combination of claim 1, said lens system being focusable on areas of a screen in adjacent juxtaposed relationship.

3. In the combination of claim 2, said first and second slides being of a different size, and said first and said second lens systems being of different magnification-power for cooperating with said slides of different sizes to transmit images of said slides onto said screen.

References Cited in the file of this patent

UNITED STATES PATENTS

| 595,541 | Hollen | Dec. 14, 1897 |
| 951,417 | Dutton | Mar. 8, 1910 |
| 1,024,734 | Massohn et al. | Apr. 30, 1912 |
| 1,461,133 | Marten | July 10, 1923 |
| 1,666,304 | Proctor | Apr. 27, 1928 |
| 2,357,593 | Leavell | Sept. 5, 1944 |
| 2,754,722 | Howell et al. | July 17, 1956 |

FOREIGN PATENTS

| 392,144 | Great Britain | Aug. 7, 1931 |